United States Patent [19]

Martin

[11] 3,927,476

[45] Dec. 23, 1975

[54] APPARATUS FOR CHECKING A DIMENSION OF AN OBJECT

[75] Inventor: Frederick W. Martin, Pottstown, Pa.

[73] Assignee: The West Company, Phoenixville, Pa.

[22] Filed: May 31, 1974

[21] Appl. No.: 475,113

[52] U.S. Cl. .......................... 33/143 L; 33/DIG. 2
[51] Int. Cl.² ....................... G01B 7/02; G01B 7/06
[58] Field of Search .......... 33/143 L, 169 R, 147 N, 33/143 R, DIG. 2

[56] References Cited
UNITED STATES PATENTS

| | | | |
|---|---|---|---|
| 3,183,597 | 5/1965 | Donaldson et al. | 33/169 R |
| 3,750,298 | 8/1973 | Turner | 33/DIG. 2 |

Primary Examiner—Richard E. Aegerter
Assistant Examiner—Willis Little
Attorney, Agent, or Firm—Howson and Howson

[57] ABSTRACT

Fluidic apparatus which is simple, accurate and inexpensive, for checking whether a dimension of an object, such as the thickness of a bottle stopper, is within a predetermined range of values. A cylinder is provided with a pair of axially spaced-apart ports, and a piston is mounted reciprocably within the cylinder and provided with a spool having a length exceeding the length required to block off both ports by an amount substantially equal to the magnitude of the permissible range of dimension values. One end of the piston is biased outwardly toward a surface of the object to be checked by means of an air spring acting against the opposite end of the piston; the opposite surface of each object is brought to the same reference position so that when the measured dimension of the object is at the center of its permissible range, the spool will be centered with respect to the two ports and will block them both. If the object is oversized beyond the permissible range of variation, one of the ports will be unblocked; and if it is undersized beyond the permissible range of variation, the other port will be unblocked. The spool is provided with axial openings, and pressurized air is admitted to the interior of the cylinder, whereby an air flow will be produced through one or the other of the ports if the object dimension is above or below the acceptable range of dimensions, while there will be no such flow through either port if this dimension is within the acceptable range.

12 Claims, 4 Drawing Figures

U.S. Patent  Dec. 23, 1975  3,927,476
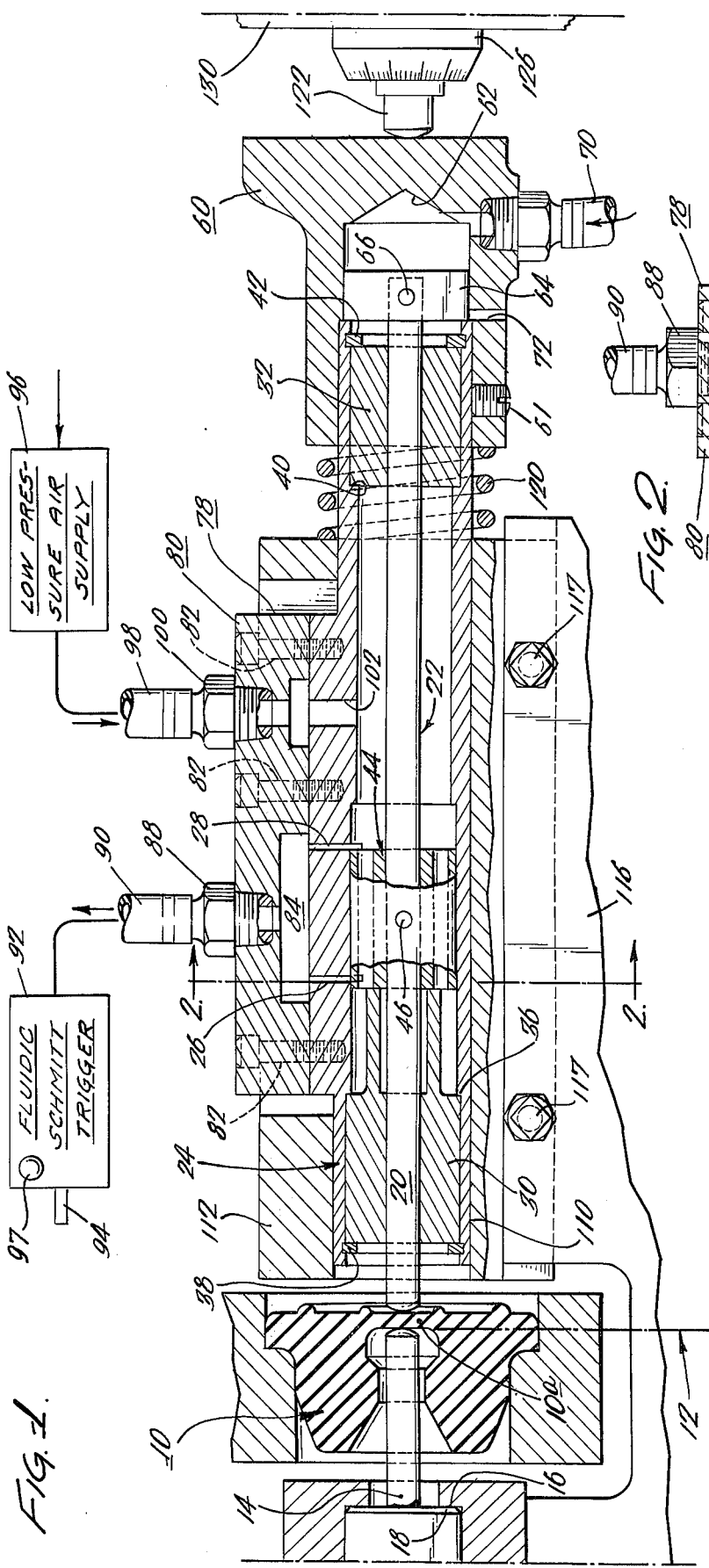

APPARATUS FOR CHECKING A DIMENSION OF AN OBJECT

BACKGROUND OF THE INVENTION

The present invention relates to apparatus for checking whether the linear dimension of an object is within or without a predetermined range, and especially to such apparatus of the fluidic type which is simple, inexpensive and accurate.

There are many commercial applications in which it is desirable to check whether a given linear dimension of an object is within or without a predetermined range of dimensions. Very commonly objects made in mass production are intended to have a certain exact linear dimension, but due to unavoidable tolerances in the manufacturing processes, the objects will exhibit some variation from this desired dimension value. Ordinarily the object is satisfactory for use so long as the dimension does not depart excessively from the desired center value, and thus a range of dimensions having a specified minimum and maximum value can be defined for which the object is acceptable; objects having values of this dimension lying outside this tolerance range are unacceptable, and may be rejected. As an example only, in the production of stopper-type bottle closures having a relatively thin closing membrane intended later to be pierced by a hypodermic needle, it is desirable to determine which closure membranes have thicknesses lying within an acceptable range of dimensions so that those having thicknesses outside this range can be rejected.

There are of course many basic ways of measuring a dimension to determine whether it lies within a certain range; for example caliper-type measurement may be employed for this purpose to determine what the dimension of each object is, or "go, no-go" mechanical gauges may be utilized to check the dimension of each object. Such procedures are of course usually relatively slow and laborious. In high speed production processes, high-speed automatic checking is also usually desirable.

Production control systems are now known which make use of so called fluidic devices; in such devices, the signalling, sensing and control entity constitutes the flow of a stream of a fluid such as air, rather than an electrical current or a mechanical motion. In such a type of control system, it is desirable that any dimension-checking apparatus utilized be compatible with the overall fluidic system, and hence that the dimension-checking device itself be of the fluidic type.

Systems are known in the prior art in which a dimension is measured by means of a mechanical element which is caused to assume a position indicative of the measured dimension of the object, the position of the mechanical member being sensed and indicated by means of fluid pressures. Such devices will indicate the magnitude of the dimension being measured, from which one can observe whether the dimension is within the desired range. Such a device does not directly indicate whether the dimension is within or outside the permissible range.

Accordingly, it is an object of the present invention to provide new and useful apparatus for checking whether the dimension of an object is within or outside a desired range.

It is also an object of the invention to provide such apparatus which provides this information directly in the form of a two state signal, rather than in the form of an analog signal which must be interpreted by an observer or by other complex equipment.

A further object is to provide such apparatus which is of the fluidic type, and therefore especially compatible with other fluidic control apparatus with which it may be used.

Another object is to provide such apparatus which is simple, inexpensive and accurate.

SUMMARY OF THE INVENTION

These and other objects of the invention are achieved by the provision of apparatus comprising hollow tubular means having port means in the wall thereof, the axially opposite extremes of the port means being spaced apart axially of the tubular means by a predetermined distance; piston means are mounted to reciprocate axially in the tubular means, and are provided with land regions the axial extremes of which are spaced apart by a distance substantially equal to said predetermined distance plus the extent of the range of acceptable dimension values. The piston means is capable of being axially positioned so that these land regions block the port means only over a predetermined range of axial positions of the piston means substantially equal in extent to the predetermined range of acceptable dimension values. Positioning means are provided for removably positioning an object whose linear dimension is to be measured, so that one surface thereof corresponding to one terminus of that dimension is in a predetermined reference axial position with respect to the above-mentioned tubular means, and so that another surface of the object corresponding to the other terminus of the dimension to be measured determines the axial position of the piston means. The reference axial position is such that an object having a value of the dimension to be measured which is at the center of the permissible range causes the piston means to assume an axial position at the center of the above-mentioned range of axial positions, so that said port means is blocked by said land regions. When the dimension value is above or below the permissible range, the port means will be unblocked. Means are also provided for applying fluid under pressure to the interior of the tubular means, so as to cause a flow of fluid through the port means when it is not blocked by the land regions. Fluid-flow detecting means are utilized which respond to the flow of fluid through the port means for producing a first output signal when the rate of flow of fluid is below a small threshold level, and for producing a second output signal discretely different from the first output signal whenever the rate of fluid exceeds the above-mentioned threshold level. Accordingly, the fluid-flow detecting means produces either of two discretely different output signals depending upon whether the port means is blocked or unblocked, and therefore depending upon whether the dimension being measured is within the acceptable range or not.

In a preferred embodiment of the invention in which it is applied to measure the thickness of an object, such as the membrane of a stopper-type bottle closure, the port means preferably comprises a pair of axially spaced-apart ports, and the land regions comprise surface regions of a spool portion of the piston means. The spool portion is provided with axial openings therethrough for the passage of the fluid, which is preferably air, so that supplying air to one side of the spool portion serves also to supply such air to the other side of the spool portion. In this preferred form, a manifold means collects the fluid flow from both of the ports and supplies it to an input of the fluid-flow detecting means, so that the flow from either port will operate the fluid-flow detecting means and produce the same out-of-tolerance indication whether the object thickness is too great or too small. The fluid-flow detecting means preferably comprises a Schmitt type of fluidic trigger device. The preferred apparatus also preferably comprises air-spring means which urges the piston means outward against the object to be measured, so that the piston means will assume an axial position determined by the dimension to be measured.

The apparatus is simple, inexpensive yet accurate, easy to use and adapt to an automative system, and highly compatible with a fluidic control system.

BRIEF DESCRIPTION OF FIGURES

These and other objects and features of the invention will be more readily understood from a consideration of the following detailed description, taken in connection with the accompanying drawings, in which:

FIG. 1 is a longitudinal sectional view, with parts in full and partly in block form, illustrating a preferred embodiment of the invention, for the case in which the dimension being measured is unacceptably small;

FIG. 2 is a cross-sectional view taken along lines 2—2 of FIG. 1; and

FIGS. 3 and 4 are fragmentary views illustrating two different relative positions of the port means and the spool of the piston means of FIGS. 1 and 2, for the cases in which the dimension being measured in within tolerance and for the case in which the thickness is greater than permissible, respectively.

DESCRIPTION OF SPECIFIC EMBODIMENTS

Referring now to the embodiment of the invention illustrated in the figures by way of example only, there is shown an object 10 whose linear dimension is to be checked, in this instance constituting a rubber stopper-type closure for a bottle, the thickness of the closing membrane 10a of which is to be checked to see if it lies within a predetermined acceptable range. As an example only, the permissible range of thickness may be from about 0.040 to 0.060 inch, constituting a tolerance range of about 0.020 inch. In this example, the object 10 is placed in a position such that the left side of the membrane 10a lies along a predetermined reference line 12 defining a fixed reference position for this side of the object. There are many ways in which this can be done manually or automatically; in the present example, this reference position is defined by the right-hand tip of a positioning member 14 having a shoulder 16 bearing against a fixed stop 18. Positioning member 14 can be withdrawn to the left so as to permit insertion of successive objects to be measured, and then moved to the right in contact with the left surface of the object until its shoulder 16 abuts stop 18, thus defining the position of the left-hand edge of the object. The object 10 is held against the tip of the positioning member 14 by light pressure applied to the opposite side thereof by the outwardly extending tip of the stem portion 20 of piston means 22. Since the left-hand side of the object 10 is always placed in the same reference position, the thickness of the object is indicated by the position of its right-hand surface, and hence by the axial position of the piston means 22.

Piston means 22 is axially reciprocable in hollow tubular means 24, which tubular means is provided with port means in the wall thereof in the form of two transverse axial spaced-apart slit-like ports 26 and 28. Piston means 22 is mounted in tubular means 24 by means of bushings 30 and 32 positioned near opposite ends of the stem 20, and through the center of which stem 20 is adapted to slide axially. Bushing 30 is positioned at its inner end by an internal shoulder 36 on the hollow tubular means 24, and at its opposite or outer end is held by a spring washer 38 mounted in a recess in the interior surface of tubular means 24. Similarly, bushing 32 is held in position at its inner end by an internal shoulder 40 of tubular means 24, and at its opposite or outer end by a spring washer 42 engaged in a recess in the interior surface of tubular means 24.

Piston means 22 comprises a spool 44 concentric with the stem 20 and secured thereon by a pin 46. The outer periphery of the spool 44 is sufficient to mate closely with the interior surrounding surface of the tubular means 24 and therefore to block off the inner ends of either of the ports 26 and 28 with which it is axially aligned at a given time. Spool 44 also contains a plurality of axial bores such as 50 extending completely through it, so that air can pass freely from one side of the spool to the other.

In accordance with the invention, the peripheral surfaces of the spool 44 adjacent the axially opposite ends thereof constitute land regions for blocking off the port means, and the distance between the opposite axial extremes of these land regions (in this case corresponding to the axial length of the spool 44) exceeds the distance between the opposite axial extremes of the ports (in this case the distance from the left-hand side of the port 26 to the right-hand side of port 28) by an amount substantially equal to the tolerance range of acceptable thicknesses of the object 10.

The right-hand end of tubular means 24 is provided with a cap-like end closure 60 held in position by set-screw 61 and defining a chamber 62 into which the piston stem 22 extends to support a second spool 64; spool 64 is mounted in slidable pressure-retaining relation with the interior sidewalls of chamber 62 and fixed to stem 20 by pin 66. Chamber 62 is supplied with pressurized air from air inlet 70, and a vent 72 to atmosphere is provided at the left-hand side of spool 64 to avoid any transfer of the pressure in chamber 62 into the central portion of the interior of the tubular means 24 near the spool 44. This arrangement operates as an air spring to bias the piston means to the left, whereby maintenance of contact is assured against the right-hand surface of the object 10 to be measured. The right-hand extreme of bushing 30 provides a stop for preventing the piston means from moving unnecessarily far outward from the hollow tubular means 24.

The portion of the hollow tubular means 24 containing the ports 26 and 28 is provided on its exterior surface with a flat, generally rectangular, boss 78, through which the ports 26 and 28 also extend. A manifold cover plate 80 is secured to boss 78 by countersunk screws such as 82, and encompasses a manifold chamber 84 bridging the outer ends of the ports 26 and 28. An outlet air fitting 88 extends through the manifold cover in threaded engagement therewith to communicate with the manifold chamber. Outlet fitting 88 is connected by suitable tubing 90 to an input of a fluidic Schmitt trigger 92, which may be a conventional, commercially-available device which produces one state of output signal when the rate of flow of air into its input through tube 90 is zero or less than a very low threshold level, and produces a discretely different second state of output signal so long as the rate of flow of air into it exceeds this threshold level. The output of the fluidic Schmitt trigger may be in the form of an air stream delivered through an outlet 94 to serve other control purposes, such as operation of a reject mechanism for objects found to be out of tolerance; the trigger may also contain suitable arrangements for operating a visible indicator, such as a lamp 96 which will light up only when a substantial rate of inflow of air to the trigger indicates an out-of-tolerance-object.

Low pressure air is supplied to the interior of hollow tubular member 24 from a low-pressure air supply 96 by way of tubing 98, inlet gas fitting 100 threaded into manifold cover 80, and an inlet port 102 extending through boss 78 to the interior of the hollow tubular means 24. Typically the level of air pressure for the inlet air supply 96 is of the order of 15 inches of water.

During operation, the low-pressure inlet air will be trapped and blocked inside the tubular means 24 if the object being measured is within tolerance and the ports 26 and 28 blocked off as shown in FIG. 3; however, if the object is out of tolerance, one or the other of ports 26 of 28 will be unblocked, and the inlet air will be able to flow through the unblocked port through the manifold chamber 84 and thence to the fluidic Schmitt trigger 92, as shown in FIG. 1. The latter device may typically be of a type which produces one state of output when the rate of flow of air into it is less than one standard cubic centimeter per minute, but which changes to its opposite discretely different state when the input flow exceeds this threshold of one standard cubic centimeter per minute.

It will be understood that in order to permit set up of the apparatus to check objects of different nominal dimensions, the relative axial position of the hollow tubular means 24 and of the ports 26 and 28 fixed therein is preferably made adjustable with respect to the position of the reference line 12, but is held constant during checking of objects of the same nominal dimension. To this end, tubular means 24 is shown as axially slidable in a passageway 110 in a split supporting block 112 which in turn is axially slidable in a supporting guideway 114 in a supporting platform 116. For initial rough axial adjustment, the supporting block 110 is slid axially to approximately the correct position and held there by tightening of screws such as 117. A coil spring 120 acting between the left-hand end of end closure 60 and a stop 122 on supporting block 112 biases to the right the tubular means 24 and the parts secured thereto. For a fine axial adjustment, a vernier screw device 126 is provided, acting between end closure 60 and a frame member 130 fixed with respect to the platform 116. The vernier screw device 126 is adjusted, with a standard test object of exactly the correct nominal dimension, to a position midway between the two positions for which trigger 92 indicates too great and too small a dimension value.

In the overall operation of the system, in the absence of object 10 the air-spring action produced by the pressure in chamber 62 urges the piston means leftward and outwardly until spool 44 bears against a stop provided by the left-hand end of bushing 30. Positioning member 14 may then be retracted, the object 10 placed in position, and the positioning member advanced until its end bears against the left-hand side of the object 10 along the predetermined reference line 12 determined by stop 18, whereby the piston means 22 is moved inwardly to the right against the air spring to an extent determined by the position of the right-hand surface of the object and hence by the thickness of the object. The ports 26 and 28 and the spool 44 are so positioned that if the thickness of the object 10 is in the center of its permissible tolerance range, the spool 44 will be centered with respect to the two ports. This condition is represented in FIG. 3, for example. Under these conditions no air will pass through the ports to the fluidic Schmitt trigger, and the latter device will remain in its first state, which it characteristically possesses when its input is below a predetermined small threshold level. If the thickness of the object is only slightly greater or smaller than its desired center value so as to be within tolerance, the spool 44 will move axially slightly in either direction but, because its length is greater than the distance between the extremes of the two ports by an amount equal to the tolerance range, it will not uncover either port during such small motions and any object within tolerance will therefore not operate the Schmitt trigger.

However, if the thickness of the object is below the minimum established by the permissible allowable range of dimensions, the piston means will be positioned sufficiently far to the left, as shown in FIG. 1, that the outlet port 28 will become unblocked and the inlet air in tubular member 24 will flow through port 28, manifold 84, fitting 88 and tubing 90 to the fluidic Schmitt trigger 92 at a sufficient rate to trigger it to its opposite state indicative of an out-of-tolerance condition. Because of the high sensitivity of the fluidic Schmitt trigger, only an extremely small motion of the piston means is sufficient to actuate the trigger between its opposite states.

FIG. 4 illustrates the opposite condition when the object thickness is greater than is acceptable. In this case, the piston means and the spool 44 are positioned sufficiently to the right that the port 26 is unblocked, and the inlet air from inlet 102 then flows through the openings in spool 44 and outward through port 26, the manifold chamber 84, the fitting 88 and tubing 90 to the Schmitt trigger to actuate it to its out-of-tolerance-indicating condition.

There has therefore been provided a simple, inexpensive but accurate fluidic apparatus for producing one output indication when a linear dimension of an object is within a predetermined range, and another discretely different output indication when it is outside that range.

In other embodiments the axially central portion of the spool may be recessed, since the only portions of the spool used for land regions are those near the opposite axial extremes thereof. It is also possible to utilize a single axial slot in place of the two outlet ports 26 and 28, the opposite ends of which single port will be unblocked when the spool moves in either direction to an extent indicative of an out-of-tolerance dimension. Also, the tubular means may have any cross-sectional shape and need not be circularly cylindrical; and if desired, the output streams from the two ports may be separately sensed instead of being combined, thereby to provide separate indications of oversize and undersize dimensions.

The output of the Schmitt trigger will, of course, only represent the in-or-out-of-tolerance condition when an object is in the reference position for measurement. In an automated system, if desired an appropriate conventional sensor such as a microswitch may be used to produce a signal indicating when the object is in the proper measurement position, and this signal may be used to gate on the output of the Schmitt trigger only when the object is in its proper measurement position.

Thus, while the invention has been described with particular reference to specific embodiments thereof, it will be understood that it may be embodied in a variety of forms diverse from those specifically shown and described, without departing from the spirit and scope of the invention as defined by the appended claims.

What is claimed is:

1. Apparatus for providing indications of whether a linear dimension of an object is within or outside a predetermined range of values, comprising:

hollow tubular means having port means in the wall thereof, the axially opposite extremes of said port means being spaced apart along the longitudinal axis of said tubular means by a predetermined distance;

piston means axially reciprocable along said longitudinal axis in said tubular means and having land regions the axial extremes of which are spaced apart along said longitudinal axis by a distance substantially equal to said predetermined distance plus the extent of said range of dimension values, said piston means being axially positionable along said longitudinal axis so that said land regions block said port means only over a predetermined range of axial positions of said piston means substantially equal in extent to said predetermined range of dimension values;

positioning means for removably positioning an object whose linear dimension is to be measured so that one surface thereof corresponding to one terminus of said dimension is in a predetermined reference axial position with respect to the longitudinal dimension of said tubular means, and so that another surface corresponding to the other terminus of said dimension determines the axis position of said piston means along said longitudinal axis, said reference axial position being such that an object having a value of said dimension at the center of said range of dimension values causes said piston means to assume an axial position at the center of said range of axial positions of said piston means;

means for applying fluid under pressure to the interior of said tubular means so as to cause a flow of said fluid through said port means when said port means is not blocked by said land regions; and fluid-flow detecting means responsive to the flow of fluid through said port means for producing a first output signal when the rate of said flow is below a small threshold level and for producing a second output signal discretely different from said first output signal whenever said rate of flow exceeds said threshold level.

2. Apparatus in accordance with claim 1, in which said port means comprises a pair of ports spaced apart along said longitudinal axis.

3. Apparatus in accordance with claim 2, in which said land regions comprise surface regions of a spool integral with said piston means.

4. Apparatus in accordance with claim 3, in which said spool is provided with openings therethrough along the longitudinal dimension thereof for the passage of said fluid.

5. Apparatus in accordance with claim 3, comprising manifold means for collecting the flow of said fluid from both of said ports and for supplying it to one input of said fluidflow detecting means.

6. Apparatus in accordance with claim 1, in which said fluid-flow detecting means comprises a fluidic Schmitt trigger device.

7. Apparatus in accordance with claim 1, in which said positioning means comprises means for urging said object against one end of said piston means.

8. Apparatus in accordance with claim 7, comprising air-spring means urging said piston means outward against said object.

9. Apparatus for producing a first output signal when the thickness of an object is within a predetermined tolerance range and for producing a second output signal discretely different from said first output signal when said thickness is outside said range, comprising:

cylinder means and piston means axially reciprocable therein along the longitudinal axis of said cylinder means, said cylinder means having two outlet ports spaced apart along said longitudinal axis and said piston means having a spool portion of a diameter sufficient to block either or both of said parts with which it is axially aligned, said spool portion having a length substantially equal to the distance measured along said longitudinal axis between the opposite axial extremes of said two outlet ports plus a distance equal to said tolerance range;

means for supplying the interior of said cylinder means with pressurized air so as to produce a flow of air through either of said outlet ports which is unblocked;

means for contacting one end of said piston means with one side of said object and for positioning the opposite side of said object in a reference position so that when the thickness of said object is at the center of said tolerance range said spool portion is axially centered along said longitudinal axis with respect to said two outlet ports; and a fluidic trigger device responsive to the rate of flow of air through either of said outlet ports for producing a first output signal when said rate is less than a predetermined small threshold rate and for producing a second output signal discretely different from said first signal whenever said rate exceeds said threshold.

10. Apparatus in accordance with claim 9, in which said spool portion is provided with openings extending therethrough along said longitudinal axis for the passage of air.

11. Apparatus in accordance with claim 9, in which said means for contacting one end of said piston means and for positioning the opposite end of said object comprises air-spring means for urging said piston means outwardly against said object.

12. Apparatus in accordance with claim 11, in which said air-spring means comprises a second spool integral with said piston means and means for delivering pressurized air to the inward side of said second spool.

* * * * *